United States Patent
Okamura et al.

(10) Patent No.: US 11,396,482 B2
(45) Date of Patent: Jul. 26, 2022

(54) CUBIC BORON NITRIDE SINTERED MATERIAL, CUTTING TOOL INCLUDING CUBIC BORON NITRIDE SINTERED MATERIAL, AND METHOD OF PRODUCING CUBIC BORON NITRIDE SINTERED MATERIAL

(71) Applicants: Sumitomo Electric Industries, Ltd., Osaka (JP); Sumitomo Electric Hardmetal Corp., Itami (JP)

(72) Inventors: Katsumi Okamura, Osaka (JP); Yuichiro Watanabe, Osaka (JP); Akito Ishii, Osaka (JP); Takashi Harada, Osaka (JP); Satoru Kukino, Itami (JP)

(73) Assignees: SUMITOMO ELECTRIC INDUSTRIES, LTD., Osaka (JP); SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/262,215

(22) PCT Filed: Sep. 18, 2019

(86) PCT No.: PCT/JP2019/036570
§ 371 (c)(1),
(2) Date: Jan. 22, 2021

(87) PCT Pub. No.: WO2020/059755
PCT Pub. Date: Mar. 26, 2020

(65) Prior Publication Data
US 2021/0246078 A1    Aug. 12, 2021

(30) Foreign Application Priority Data
Sep. 19, 2018 (JP) .............................. JP2018-174696

(51) Int. Cl.
*C04B 35/5831* (2006.01)
*C01B 21/064* (2006.01)
*B23B 27/14* (2006.01)

(52) U.S. Cl.
CPC ...... *C04B 35/5831* (2013.01); *C01B 21/0648* (2013.01); *B23B 27/14* (2013.01);
(Continued)

(58) Field of Classification Search
CPC ........ C04B 35/5831; C04B 2235/3847; C04B 2235/402; C04B 2235/405; C04B 2235/48; C04B 2235/5454
See application file for complete search history.

(56) References Cited

U.S. PATENT DOCUMENTS 8,999,511 B2 * 4/2015 Kobayashi .......... C04B 35/6303
428/457
9,346,716 B2 * 5/2016 Okamura .......... C04B 35/62842
(Continued)

FOREIGN PATENT DOCUMENTS

EP    0 228 715 B1    9/1991
JP    2006-21977 A    1/2006
(Continued)

OTHER PUBLICATIONS

Notice of Reasons for Refusal dated Apr. 7, 2020, received for JP Application 2020-506825, 7 pages including English Translation.
(Continued)

*Primary Examiner* — Pegah Parvini
*Assistant Examiner* — Ross J Christie
(74) *Attorney, Agent, or Firm* — Xsensus LLP (57) ABSTRACT

A cubic boron nitride sintered material includes: more than or equal to 85 volume % and less than 100 volume % of cubic boron nitride grains; and a remainder of a binder, wherein the binder includes WC, Co and an Al compound,
(Continued)

and when a TEM-EDX is used to analyze an interface region including an interface at which the cubic boron nitride grains are adjacent to each other, oxygen exists on a whole or part of the interface, and a width D of a region in which the oxygen exists is more than or equal to 0.1 nm and less than or equal to 10 nm.

4 Claims, 2 Drawing Sheets

(52) U.S. Cl.
CPC ...... *C01P 2004/38* (2013.01); *C01P 2004/64* (2013.01); *C01P 2006/80* (2013.01); *C04B 2235/3847* (2013.01); *C04B 2235/402* (2013.01); *C04B 2235/405* (2013.01); *C04B 2235/48* (2013.01); *C04B 2235/5454* (2013.01)

(56) References Cited

U.S. PATENT DOCUMENTS

| | | | |
|---|---|---|---|
| 2008/0016785 A1 | 1/2008 | Kukino et al. | |
| 2008/0214383 A1 | 9/2008 | Matsukawa et al. | |
| 2009/0120011 A1 | 5/2009 | Okamura et al. | |
| 2013/0260165 A1* | 10/2013 | Kobayashi | B32B 15/04 428/564 |
| 2013/0291446 A1* | 11/2013 | Kukino | C04B 35/645 51/309 |
| 2017/0341155 A1* | 11/2017 | Yano | B23B 27/148 |
| 2019/0300439 A1* | 10/2019 | Ikeda | C30B 29/04 |

FOREIGN PATENT DOCUMENTS

| | | | |
|---|---|---|---|
| JP | 2006-169080 A | 6/2006 | |
| JP | 2006-347850 A | 12/2006 | |
| JP | 2007-70148 A | 3/2007 | |
| KR | 10-2008-0069508 A | 7/2008 | |
| WO | 2005/066381 A1 | 7/2005 | |
| WO | 2006/112156 A1 | 10/2006 | |
| WO | WO-2016084929 A1 * | 6/2016 | ............. B23B 27/14 |
| WO | WO-2018101346 A1 * | 6/2018 | ............. C04B 41/87 |

OTHER PUBLICATIONS

Decision to Grant dated Jul. 21, 2020, received for JP Application 2020-506825, 6 pages including English Translation.

* cited by examiner

CUBIC BORON NITRIDE SINTERED MATERIAL, CUTTING TOOL INCLUDING CUBIC BORON NITRIDE SINTERED MATERIAL, AND METHOD OF PRODUCING CUBIC BORON NITRIDE SINTERED MATERIAL

CROSS-REFERENCE TO RELATED APPLICATIONS

The present application is based on PCT filing PCT/JP2019/036570, filed Sep. 18, 2019, which claims priority to Japanese Patent Application No. 2018-174696, filed on Sep. 19, 2018, the entire contents of each are incorporated herein by reference. This disclosure is also related to co-pending U.S. application Ser. No. 17/262,220 , which is entitled: METHOD OF PRODUCING CUBIC BORON NITRIDE SINTERED MATERIAL, CUBIC BORON NITRIDE SINTERED MATERIAL, AND CUTTING TOOL INCLUDING CUBIC BORON NITRIDE SINTERED MATERIAL, filed concurrently with the present application, which is also incorporated herein by reference.

TECHNICAL FIELD

The present disclosure relates to a cubic boron nitride sintered material, a cutting tool including the cubic boron nitride sintered material, and a method of producing the cubic boron nitride sintered material.

BACKGROUND ART

A cubic boron nitride sintered material (hereinafter, also referred to as "cBN sintered material") is a high-hardness material used for cutting tools and the like. The cubic boron nitride sintered material is normally constituted of cubic boron nitride grains (hereinafter, also referred to as "cBN grains") and a binder. Depending on a content ratio of the cubic boron nitride grains, characteristics of the cBN sintered material tend to differ.

Hence, in the field of cutting, different types of cubic boron nitride sintered materials are applied to cutting tools in accordance with the material of a workpiece, required precision in processing, or the like. For example, a cubic boron nitride sintered material (hereinafter, also referred to as a "high-cBN sintered material") having a high content ratio of cubic boron nitride (hereinafter, also referred to as "cBN") can be suitably used for cutting of a sintered alloy or the like.

However, the high-cBN sintered material tends to be likely to be sporadically chipped. Such sporadic chipping is considered to be caused due to the following reason: binding strength between the cubic boron nitride grains is weak to result in falling of the cubic boron nitride grains. For example, WO 2005/066381 (PTL 1) discloses a technique of suppressing occurrence of unexpected chipping in a high-cBN sintered material by appropriately selecting a binder.

CITATION LIST

Patent Literature

PTL 1: WO 2005/066381

SUMMARY OF INVENTION

A cubic boron nitride sintered material according to one embodiment of the present disclosure includes: more than or equal to 85 volume % and less than 100 volume % of cubic boron nitride grains; and a remainder of a binder, wherein the binder includes WC, Co and an Al compound, and when a TEM-EDX is used to analyze an interface region including an interface at which the cubic boron nitride grains are adjacent to each other, oxygen exists on a whole or part of the interface, and a width D of a region in which the oxygen exists is more than or equal to 0.1 nm and less than or equal to 10 nm.

A cutting tool according to one embodiment of the present disclosure is a cutting tool including the above-described cubic boron nitride sintered material.

A method of producing a cubic boron nitride sintered material according to one embodiment of the present disclosure is a method of producing the above-described cubic boron nitride sintered material, and includes: forming an organic cubic boron nitride powder by removing oxygen of cubic boron nitride source material powder and attaching an organic substance onto the cubic boron nitride source material powder; preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al; and obtaining the cubic boron nitride sintered material by sintering the powder mixture.

DETAILED DESCRIPTION

[Problems to be Solved by the Present Disclosure]

In recent years, due to rapid improvement in functions of mechanical parts, it becomes more difficult to cut workpieces to serve as the mechanical parts. This leads to a short life of a cutting tool, thus apparently resulting in increased cost, disadvantageously. Therefore, further improvement of a high-cBN sintered material has been desired. In view of this, it is an object of the present disclosure to provide a cubic boron nitride sintered material having a long life, a cutting tool including the cubic boron nitride sintered material, and a method of producing the cubic boron nitride sintered material.

[Advantageous Effect of the Present Disclosure]

According to the cubic boron nitride sintered material obtained as described above, a long life can be attained, with the result that the life of the cutting tool including the cubic boron nitride sintered material can also be long.

[Description of Embodiments]

In order to attain a longer life of a cubic boron nitride sintered material, the present inventors have considered it necessary to further suppress falling of cubic boron nitride grains in a high-cBN sintered material. However, in order to attain this and achieve breakthrough, the present inventors have considered it necessary to take an approach different from the conventional technique.

First, the present inventors have checked a state of cubic boron nitride source material powder (cubic boron nitride powder serving as a source material of the cubic boron nitride sintered material). Specifically, the cubic boron nitride source material powder was observed using a transmission electron microscope (TEM). As a result, it has been found that: oxygen (O) exists on surfaces of particles of the cubic boron nitride source material powder; and the oxygen exists in a state of $B_2O_3$ or exists in an amorphous state in which the oxygen is mixed with boron (B). Further, it has been found that when a cubic boron nitride sintered material is produced using such a cubic boron nitride source material powder, a large amount of oxygen remains in the cubic boron nitride sintered material.

The cubic boron nitride grains in the cubic boron nitride sintered material are bound together presumably in the following manner: B (boron) and/or N (nitrogen) are diffused and re-precipitated by way of a binder (mainly Co) existing between the cubic boron nitride grains, thus resulting in neck growth between the cubic boron nitride grains. The present inventors have formulated the following hypothesis: the existence of oxygen on the surfaces of the cubic boron nitride particles during sintering hinders occurrence of neck growth between the cubic boron nitride grains to decrease binding strength between the cubic boron nitride grains, with the result that falling of the cubic boron nitride grains occurs. It should be noted that in the present specification, the "hindrance of occurrence of neck growth" is also referred to as "neck growth suppression".

In view of this, the present inventors have reviewed a method of removing oxygen from the cubic boron nitride source material powder. First, general heat treatment, specifically, reduction treatment using hydrogen or ammonia, was performed. However, in such heat treatment, oxygen could not be removed appropriately.

Next, the present inventors have paid attention to supercritical water. Since supercritical water has very high solubility, the present inventors have considered that oxygen can be removed from the cubic boron nitride source material powder by dissolving, in the supercritical water, oxygen included in the cubic boron nitride source material powder. However, when an experiment was repeatedly conducted to expose the cubic boron nitride source material powder to the supercritical water, it was confirmed that an amount of oxygen on the cubic boron nitride source material powder is increased.

The present inventors have inspected the obtained experiment result from various point of views, and have made inference with regard to two mechanisms based on the inspection result. The first mechanism is as follows: oxygen is removed from the cubic boron nitride source material powder in the supercritical water that is under an oxidizing environment, whereas the cubic boron nitride source material powder undergoes adsorption (reoxidation) of oxygen with the supercritical water serving as a supply source of oxygen. The second mechanism is as follows: the cubic boron nitride source material powder is reoxidized due to handling or the like of the cubic boron nitride source material powder after the removal of oxide. In view of the above, the present inventors have considered that the reoxidation caused by the above-described mechanisms can be prevented by performing certain treatment onto surfaces of particles of the cubic boron nitride source material powder from which oxide has been removed. Accordingly, the present inventors have conducted diligent study.

As a result of diligent study, it has been found that removal of oxygen and suppression of reoxidation can be attained by removing oxygen of cubic boron nitride source material powder and attaching an organic substance onto surfaces of particles of the cubic boron nitride source material powder from which the oxide has been removed. Further, the above-described hypothesis is supported as follows: in a cubic boron nitride sintered material produced using the obtained cubic boron nitride source material powder, falling of cubic boron nitride grains is suppressed significantly.

The present disclosure has been completed based on the above-described knowledge. Hereinafter, embodiments of the present disclosure will be listed and described.

[1] A cubic boron nitride sintered material according to one embodiment of the present disclosure includes: more than or equal to 85 volume % and less than 100 volume % of cubic boron nitride grains; and a remainder of a binder, wherein the binder includes WC, Co and an Al compound, and when a TEM-EDX is used to analyze an interface region including an interface at which the cubic boron nitride grains are adjacent to each other, oxygen exists on a whole or part of the interface, and a width D of a region in which the oxygen exists is more than or equal to 0.1 nm and less than or equal to 10 nm.

In view of the content of the cubic boron nitride grains, it is understood that the cubic boron nitride sintered material is a "high-cBN sintered material" in which falling of the cubic boron nitride grains is likely to occur. However, unlike the conventional high-cBN sintered material, the above-described cubic boron nitride sintered material is a cubic boron nitride sintered material having a long life with falling of cubic boron nitride grains being suppressed. This is presumably due to the following reason.

When a TEM-EDX was used to analyze an interface region including an interface at which cubic boron nitride grains were adjacent to each other in the conventional cubic boron nitride sintered material, width D of a region in which oxygen existed on the interface greatly exceeded 10 nm. On the other hand, in the above-described cubic boron nitride sintered material, width D is more than or equal to 0.1 nm and less than or equal to 10 nm. Such a difference in structure is considered to result from a smaller amount of oxygen in the cubic boron nitride sintered material according to one embodiment of the present disclosure than that in the conventional cubic boron nitride sintered material. According to the above-described cubic boron nitride sintered material, neck growth suppression caused by the oxygen is less likely to occur than in the conventional cubic boron nitride sintered material, thereby increasing binding strength between the cubic boron nitride grains as compared with the conventional cubic boron nitride sintered material. As a result, the falling of the cubic boron nitride grains are suppressed.

[2] In the cubic boron nitride sintered material, the width D is more than or equal to 0.1 nm and less than or equal to 5 nm. In this case, the life of the cubic boron nitride sintered material can be longer.

[3] In the cubic boron nitride sintered material, a maximum value M of a content of the oxygen in the region in which the oxygen exists is less than or equal to 5.0 atom %. In this case, the life of the cubic boron nitride sintered material can be longer.

[4] A cubic boron nitride sintered material according to one embodiment of the present disclosure is a cutting tool including the above-described cubic boron nitride sintered material. According to the cutting tool, a long life can be attained.

[5] A method of producing a cubic boron nitride sintered material according to one embodiment of the present disclosure is a method of producing the above-described cubic boron nitride sintered material, and includes: forming an organic cubic boron nitride powder by removing oxygen of cubic boron nitride source material powder and attaching an organic substance onto the cubic boron nitride source material powder (forming step); preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al (preparing step); and obtaining the cubic boron nitride sintered material by sintering the powder mixture (sintering step).

According to the above-described production method, in the forming step, the oxygen of the cubic boron nitride source material powder is removed and the organic substance is attached onto the cubic boron nitride source material powder from which the oxygen has been removed. Accordingly, the removal of oxygen of the cubic boron nitride source material powder and the suppression of reoxidation are attained. That is, according to the above-described production method, the organic cubic boron nitride powder having a smaller amount of oxygen than that in the conventional cubic boron nitride powder is used as the cubic boron nitride source material powder to be used for the sintering step. Moreover, carbon remains on the surfaces of the particles of the organic cubic boron nitride powder during the sintering, whereby oxygen remaining in the organic cubic boron nitride powder can be further removed. This is due to the following reason: the carbon and the oxygen react with each other to form carbon monoxide and/or carbon dioxide, which are then discharged from the organic cubic boron nitride powder. Thus, in the sintering step, the neck growth suppression caused by the oxygen is reduced, thereby obtaining the cubic boron nitride sintered material excellent in the binding strength between the cubic boron nitride grains.

Due to the reason above, according to the method of producing the cubic boron nitride sintered material according to one embodiment of the present disclosure, there can be produced a cubic boron nitride sintered material having a long life with falling of the cubic boron nitride grains being suppressed, even though the cubic boron nitride sintered material is a high-cBN sintered material.

[6] In the method of producing the cubic boron nitride sintered material, the forming of the organic cubic boron nitride powder includes introducing the cubic boron nitride source material powder and the organic substance into supercritical water. The oxygen on the surfaces of the particles of the cubic boron nitride source material powder is dissolved in the supercritical water, and is discharged from the surfaces of the particles of the cubic boron nitride source material powder. Accordingly, the surfaces of the particles of the cubic boron nitride source material powder are cleaned.

The organic substance can be efficiently attached onto the cleaned surfaces of the particles of the cubic boron nitride source material powder. This facilitates preparation of the organic cubic boron nitride powder in which the organic substance is uniformly attached on the surfaces (cleaned surfaces with the oxygen being removed therefrom) of the particles of the cubic boron nitride source material powder.

[7] In the method of producing the cubic boron nitride sintered material, the organic substance is an amine or a hydrocarbon compound having a carbon number of more than or equal to 5. Accordingly, the falling of the cubic boron nitride grains in the produced cubic boron nitride sintered material is dramatically reduced.

[8] In the method of producing the cubic boron nitride sintered material, the organic substance is hexylamine, hexanenitrile, paraffin, or hexane. Accordingly, the falling of the cubic boron nitride grains in the produced cubic boron nitride sintered material is dramatically reduced.

[9] In the method of producing the cubic boron nitride sintered material, the forming of the organic cubic boron nitride powder includes attaching the organic substance onto surfaces of particles of the cubic boron nitride source material powder after etching the surfaces of the particles of the cubic boron nitride source material powder by plasma treatment. According to this step, by etching the surfaces of the particles of the cubic boron nitride source material powder, cleaned surfaces can be formed with oxygen being removed therefrom, whereby the organic substance is attached onto the cleaned surfaces. This facilitates preparation of the organic cubic boron nitride powder in which the organic substance is uniformly attached on the surfaces (cleaned surfaces with the oxygen being removed therefrom) of the particles of the cubic boron nitride source material powder.

[10] In the method of producing the cubic boron nitride sintered material, the organic substance is an amine or carbon fluoride.

[Details of Embodiments of the Present Disclosure]

The following describes one embodiment (hereinafter, referred to as "the present embodiment") of the present disclosure. The present embodiment is not limited thereto. It should be noted that in the present specification, the expression "A to Z" represents a range of lower to upper limits (i.e., more than or equal to A and less than or equal to Z). When no unit is indicated for A and a unit is indicated only for Z, the unit of A is the same as the unit of Z.

<First Embodiment: Cubic Boron Nitride Sintered Material>

A cubic boron nitride sintered material according to the present embodiment includes more than or equal to 85 volume % and less than 100 volume % of cubic boron nitride grains and a remainder of a binder. That is, the cubic boron nitride sintered material according to the present embodiment is a so-called high-cBN sintered material. It should be noted that the cubic boron nitride sintered material may include an inevitable impurity resulting from a source material used herein, a production condition, or the like. In this case, it is understandable that the inevitable impurity is included in the binder.

The content ratio (volume %) of the cubic boron nitride grains in the cubic boron nitride sintered material is substantially the same as the content ratio (volume %) of the cubic boron nitride source material powder used in the powder mixture described later. This is because an amount of change in volume caused by the attachment of the organic substance or the like is very small with respect to the volume of the cubic boron nitride powder itself. Therefore, by controlling the content ratio of the cubic boron nitride source material powder used in the powder mixture, the content (content ratio) of the cubic boron nitride grains in the cubic boron nitride sintered material can be adjusted to fall in a desired range.

The content ratio (volume %) of the cubic boron nitride grains in the cubic boron nitride sintered material can also be confirmed by performing quantitative analysis through inductively coupled high-frequency plasma spectrometry (ICP), or by performing structure observation, element analysis, or the like onto the cubic boron nitride sintered material using an energy dispersive X-ray analyzer (EDX) accompanied with a scanning electron microscope (SEM) or an EDX accompanied with a transmission electron microscope (TEM). In the present embodiment, unless otherwise specified, the content ratio of the cubic boron nitride grains in the cubic boron nitride sintered material is determined by a below-described method using SEM.

For example, when the SEM is used, the content ratio (volume %) of the cubic boron nitride grains can be determined as follows. First, the cubic boron nitride sintered material is cut at an arbitrary position to form a sample including a cross section of the cubic boron nitride sintered material. For the formation of the cross section, a focused ion beam device, a cross section polisher device, or the like can be used. Next, the cross section is observed by the SEM at a magnification of 2000x to obtain a reflected electron image. In the reflected electron image, a black region represents a region in which the cubic boron nitride grains exist and a gray or white region represents a region in which the binder exists.

Next, the reflected electron image is subjected to binarization processing using image analysis software (for example, "WinROOF" provided by Mitani Corporation), and each of the area ratios is calculated from the image having been through the binarization processing. The calculated area ratio is regarded as volume %, thereby finding the content ratio (volume %) of the cubic boron nitride grains. It should be noted that with this, the volume % of the binder can be found at the same time.

<<Cubic Boron Nitride Grains>>

The cubic boron nitride grains have high hardness, high strength, and high toughness, and serves as a base of the cubic boron nitride sintered material. $D_{50}$ (average grain size) of the cubic boron nitride grains is not particularly limited, and may be, for example, 0.1 to 10.0 μm. Normally, as $D_{50}$ is smaller, the hardness of the cubic boron nitride sintered material tends to be higher. Moreover, as variation in the grain sizes is smaller, the characteristics of the cubic boron nitride sintered material tend to be more uniform. $D_{50}$ of the cubic boron nitride grains is preferably, for example, 0.5 to 4.0 μm.

$D_{50}$ of the cubic boron nitride grains is determined as follows. First, a sample including a cross section of the cubic boron nitride sintered material is formed in a manner similar to that in the above-described method of finding the content of the cubic boron nitride grains, and a reflected electron image is obtained. Next, the equivalent circle diameter of each black region in the reflected electron image is calculated using image analysis software. It is preferable to calculate the equivalent circle diameters of 100 or more cubic boron nitride grains by performing observation in five or more visual fields.

Next, the equivalent circle diameters are arranged in an ascending order from the minimum value to the maximum value to find a cumulative distribution. $D_{50}$ represents a grain size corresponding to a cumulative area of 50% in the cumulative distribution. It should be noted that the equivalent circle diameter refers to the diameter of a circle having the same area as the area of the measured cubic boron nitride grain.

<<Binder>>

The binder serves to sinter cubic boron nitride particles at industrial levels of pressure and temperature. Each of the cubic boron nitride particles is a difficult-to-be-sintered material. Further, since the binder has lower reactivity with respect to iron than that of cubic boron nitride, the binder provides the cubic boron nitride sintered material with a function of suppressing chemical wear and thermal wear in cutting of high-hardness hardened steel. When the cubic boron nitride sintered material includes the binder, wear resistance in high-efficiency processing of high-hardness hardened steel is improved.

In the cubic boron nitride sintered material of the present embodiment, the binder includes WC (tungsten carbide), Co (cobalt), and an Al compound. Here, the "Al compound" refers to a compound including Al (aluminum) as a constituent element. Examples of the Al compound include $CoAl$, $Al_2O_3$, $AlN$, $AlB_2$, composite compounds thereof, and the like. Due to the following reasons, the binder including WC, Co and the Al compound is considered to be particularly effective in attaining a long life of the cubic boron nitride sintered material according to the present embodiment.

First, since each of Co and Al has a catalyst function, neck growth between the cubic boron nitride grains can be promoted in the sintering step. Second, WC is presumed to be effective in providing the binder with a thermal expansion coefficient close to the thermal expansion coefficient of the cubic boron nitride grains. It should be noted that the catalyst function means that B (boron) and/or N (nitrogen) of the cubic boron nitride grains is diffused or precipitated by way of Co or Al.

The composition of the binder included in the cubic boron nitride sintered material can be specified by combining XRD (X-ray diffraction measurement) and ICP. Specifically, first, a specimen having a thickness of about 0.45 to 0.50 mm is cut from the cubic boron nitride sintered material, and XRD analysis is performed onto the specimen to determine a compound, a metal, or the like based on an X-ray diffraction peak. Next, the specimen is immersed in hydrofluoric-nitric acid (acid mixture with concentrated nitric acid (60%): distilled water: concentrated hydrofluoric acid (47%)=2:2:1 at a volume ratio) within a sealed container, thereby obtaining an acid-treated solution having the binder dissolved therein. The acid-treated solution is subjected to ICP analysis to perform quantitative analysis for each metal element. The composition of the binder is determined by analyzing the results of XRD and ICP analysis.

The binder in the present embodiment may include other binder(s) in addition to WC, Co, and the Al compound. Suitable examples of the element(s) of the other binder(s) include Ni, Fe, Cr, Mn, Ti, V, Zr, Nb, Mo, Hf, Ta, Re, and the like.

<<Analysis with TEM-EDX>>

A feature of the cubic boron nitride sintered material according to the present embodiment lies in that the following conditions (1) and (2) are satisfied when the interface region including the interface at which the cubic boron nitride grains are adjacent to each other is analyzed using TEM-EDX:

(1) oxygen exists on the interface; and (2) width D of the region in which the oxygen exists is 0.1 to 10 nm.

The analysis using TEM-EDX is performed as follows. First, a sample is obtained from the cubic boron nitride sintered material, and an argon ion slicer is used to slice the sample to form a cut piece having a thickness of 30 to 100 nm. Then, the cut piece is observed using a TEM (transmission electron microscope) at a magnification of 50000x, thereby obtaining a first image. Examples of the transmission electron microscope used on this occasion include "JEM-2100F/Cs" (trademark) provided by JEOL. In the first image, one interface at which the cubic boron nitride grains are adjacent to each other is arbitrarily selected. Next, the selected interface is positioned to pass through the vicinity of the center of the image, and observation is performed at an observation magnification changed to 2000000x, thereby obtaining a second image. In the obtained second image (100 nm×100 nm), the interface exists to extend from one end of the image to the other one end of the image opposite to the foregoing one end, via the vicinity of the center of the image.

Next, element mapping analysis is performed onto the second image using EDX so as to analyze the distribution of oxygen in the second image, i.e., in the interface region including the interface. Examples of the energy dispersive X-ray analyzer used on this occasion include "EDAX" (trademark) provided by AMETEK. When a region having a high concentration of oxygen is observed on the interface (to coincide with the shape of the interface), the cubic boron nitride sintered material satisfies the above-described condition (1).

In the second image of the cubic boron nitride sintered material satisfying the condition (1), an extending direction in which the interface extends (extending direction in which the region having a high concentration of oxygen extends) is confirmed, and then element line analysis is performed in a direction substantially perpendicular to the extension direction. A beam diameter on that occasion is less than or equal to 0.3 nm, and a scanning interval is 0.1 to 0.7 nm. Width D of the region in which oxygen exists is calculated in accordance with the result of the element line analysis. When width D is 0.1 to 10 nm, the cubic boron nitride sintered material satisfies the above-described condition (2).

The above-described analyses are repeated in first images corresponding to six visual fields. When it is confirmed that the conditions (1) and (2) are satisfied in one or more visual fields, the cubic boron nitride sintered material can be regarded as the cubic boron nitride sintered material according to the present embodiment. On this occasion, the condition (1) can be recognized also as "oxygen exists on a whole or part of the interface".

Figure 1:
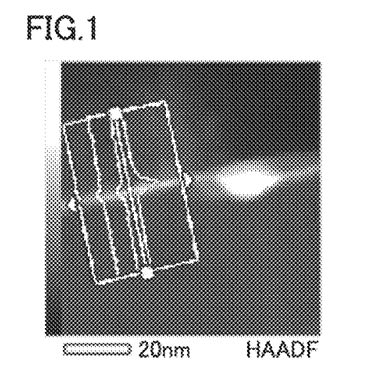
FIG. 1 shows an exemplary second image.

FIG. 1 shows an exemplary second image. Referring to FIG. 1, a black region corresponds to a region (BN region) including B and N as main constituent elements, and a white region or a gray region corresponds to a region (SF region) recognized as the interface in the first image. As shown in FIG. 1, the SF region in the second image corresponds to the "interface at which the cubic boron nitride grains are adjacent to each other", and the whole of the second image corresponds to the "interface region including the interface".

Here, when the width of the SF region (in a substantially upward/downward direction in FIG. 1) is more than 10 nm in the second image, one different interface is reselected in the first image. This is due to the following reason: when the width of the SF region is more than 10 nm, it is difficult to say that the SF region corresponds to the "interface at which the cubic boron nitride grains are adjacent to each other".

Figure 2:
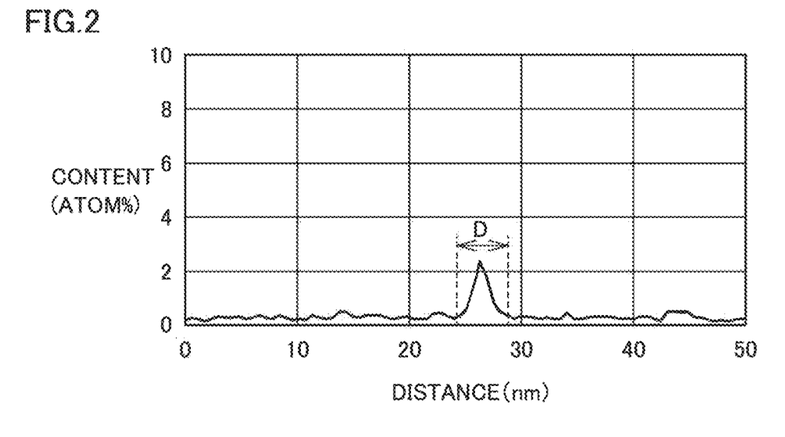
FIG. 2 is an exemplary graph showing a result of line analysis performed onto a cubic boron nitride sintered material of Experiment Example 3.

FIG. 2 is an exemplary graph based on a result of line analysis. FIG. 2 shows a result in a solid line with the horizontal axis representing a distance (nm) in which the line analysis is performed and with the vertical axis representing a value of the oxygen content (atom %) at a spot as calculated in accordance with the result of the line analysis. Referring to FIG. 2, the portion at which the peak is observed is the "region in which oxygen exists", and width D of the peak is "width D of the region in which oxygen exists".

<<Function and Effect>>

According to the cubic boron nitride sintered material according to the present embodiment, a long life can be attained. This is due to the following reason. In the conventional cubic boron nitride sintered material, width D is more than 10 nm, whereas in the cubic boron nitride sintered material according to the present embodiment, width D is less than or equal to 10 nm. That is, in the cubic boron nitride sintered material according to the present embodiment, the region in which oxygen exists is narrower and has a smaller amount of oxygen than that in the conventional cubic boron nitride sintered material.

Hence, the cubic boron nitride sintered material according to the present embodiment is less prone to neck growth suppression caused by oxygen during its production process, and therefore has more excellent neck growth than the conventional cubic boron nitride sintered material. Therefore, the cubic boron nitride sintered material according to the present embodiment has dramatically improved binding strength between the cubic boron nitride grains as compared with the conventional cubic boron nitride sintered material, thus attaining a long life. According to various studies, it has been confirmed that the above-described conditions (1) and (2) are preferably satisfied in three or more of the six visual fields observed in the above-described method.

It should be noted that theoretically, when oxygen is completely removed from the cubic boron nitride grains included in the cubic boron nitride sintered material, the cubic boron nitride sintered material has no region in which oxygen exists. Therefore, width D becomes 0 nm. However, at present, it is difficult to completely remove oxygen from the surfaces of the cubic boron nitride particles. Hence, actually, in the cubic boron nitride sintered material according to the present embodiment, width D does not fall below 0.1 nm.

Further, width D of the cubic boron nitride sintered material according to the present embodiment is preferably 0.1 to 5 nm. In this case, the life of the cubic boron nitride sintered material can be longer.

In the cubic boron nitride sintered material according to the present embodiment, maximum value M of the content of the oxygen in the region in which the oxygen exists is preferably less than or equal to 5.0 atom %. In this case, the life of the cubic boron nitride sintered material can be longer. Maximum value M of the content of the oxygen is the maximum value among the content ratios (atom %) of oxygen at respective spots as calculated in accordance with the result of the line analysis. For example, in FIG. 2, maximum value M is about 2.4 atom %.

On the other hand, when maximum value M is more than 5.0 atom %, the amount of oxygen in the cubic boron nitride grains may not be sufficiently reduced. In this case, the binding strength between the cubic boron nitride grains is not sufficiently high, with the result that the life may be extended insufficiently. It should be noted that when oxygen is removed completely in the cubic boron nitride particles, maximum value M becomes 0 atom %. However, actually, it is difficult to remove oxygen completely.

Particularly when width D is 0.1 to 5 nm and maximum value M is 5.0 atom %, the cubic boron nitride sintered material according to the present embodiment has a particularly significantly long life.

<Second Embodiment: Cutting Tool>

A cutting tool according to the present embodiment includes the above-described cubic boron nitride sintered material. In one aspect of the present embodiment, the cutting tool includes the cubic boron nitride sintered material as a substrate. The cutting tool according to the present embodiment may have a coating film on a part or whole of a surface of the cubic boron nitride sintered material serving as a substrate.

The shape and application of the cutting tool according to the present embodiment are not particularly limited. Examples of the cutting tool according to the present embodiment include a drill, an end mill, an indexable cutting insert for drill, an indexable cutting insert for end mill, an indexable cutting insert for milling, an indexable cutting insert for turning, a metal saw, a gear cutting tool, a reamer, a tap, an insert for crankshaft pin milling, and the like.

Further, the cutting tool according to the present embodiment is not limited to a cutting tool entirely composed of the cubic boron nitride sintered material, and includes a cutting tool having a portion (particularly, a cutting edge portion or the like) composed of the cubic boron nitride sintered material. For example, the cutting tool according to the present embodiment also includes a cutting tool in which a base body (supporting body) composed of a cemented carbide or the like has a cutting edge portion composed of the cubic boron nitride sintered material. In this case, the cutting edge portion is literally regarded as a cutting tool. In other words, even when the cubic boron nitride sintered material constitutes only a portion of the cutting tool, the cubic boron nitride sintered material is referred to as a cutting tool.

According to the cutting tool according to the present embodiment, the cutting tool includes the above-described cubic boron nitride sintered material, and therefore has a long life.

<Third Embodiment: Method of Producing Cubic Boron Nitride Sintered Material>

A method of producing a cubic boron nitride sintered material according to the present embodiment will be described. The method of producing the cubic boron nitride sintered material according to the present embodiment is a method of producing the cubic boron nitride sintered material according to the first embodiment.

Specifically, the method of producing the cubic boron nitride sintered material according to the present embodiment at least includes: forming an organic cubic boron nitride powder by removing oxygen of cubic boron nitride source material powder and attaching an organic substance onto the cubic boron nitride source material powder (forming step); preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al (preparing step); and obtaining the cubic boron nitride sintered material by sintering the powder mixture (sintering step). Hereinafter, each step will be described in detail.

<<Forming Step>>

This step is a step of forming an organic cubic boron nitride powder by removing oxygen of cubic boron nitride source material powder and attaching an organic substance onto the cubic boron nitride source material powder.

The cubic boron nitride source material powder is a source material powder for the cubic boron nitride grains to be included in the cubic boron nitride sintered material. The present inventors have confirmed that oxide exists on the surfaces of the particles of the cubic boron nitride source material powder. This is presumably because the cubic boron nitride source material powder formed through ultra-high pressure synthesis is subjected to a cleaning process and is exposed to an atmospheric air.

Hence, the expression "removing oxygen of the cubic boron nitride source material powder" has the following meanings: an oxide is removed from the cubic boron nitride source material powder; and oxygen atoms are removed.

Examples of the method of removing the oxygen of the cubic boron nitride source material powder and attaching the organic substance onto the cubic boron nitride source material powder include: a method employing supercritical water; a method of performing plasma treatment; and the like.

(Method Employing Supercritical Water)

The method employing supercritical water will be described. In the method, a step of introducing the cubic boron nitride source material powder and the organic substance into supercritical water is performed. Accordingly, the organic cubic boron nitride powder can be formed. It should be noted that in the present specification, the supercritical water refers to water in a supercritical state or a subcritical state.

Examples of the method of introducing the cubic boron nitride source material powder and the organic substance into the supercritical water include: a method of introducing the cubic boron nitride source material powder and the organic substance into the supercritical water in this order; a method of introducing the organic substance and the cubic boron nitride source material powder in this order; and a method of introducing the cubic boron nitride source material powder and the organic substance simultaneously.

According to the above-described method, the cubic boron nitride source material powder is brought into contact with the supercritical water, thereby dissolving, in the supercritical water, oxygen on the surfaces of the particles of the cubic boron nitride source material powder. Accordingly, cleaned surfaces are formed with oxygen being removed therefrom. This is because the supercritical water has high solubility. Moreover, the organic substance introduced into the supercritical water is efficiently attached onto the cleaned surfaces of the particles of the organic cubic boron nitride powder. This is due to the following reason: in the supercritical water, the cleaned surfaces are activated to improve the characteristics of attachment to the organic substance.

Among the above-described methods, it is preferable to employ the method of introducing the cubic boron nitride source material powder and the organic substance into the supercritical water in this order. This is because the organic substance is unlikely to be attached onto the cubic boron nitride source material powder before the oxygen is removed and the organic substance can be attached efficiently onto the cleaned surfaces.

(Method of Performing Plasma Treatment)

The method of performing plasma treatment will be described. In the method, a step of attaching the organic substance onto surfaces of particles of the cubic boron nitride source material powder after etching the surfaces of the particles of the cubic boron nitride source material powder by plasma treatment is performed. Specifically, in a plasma generating apparatus, the cubic boron nitride source material powder is exposed to an atmosphere of first gas including carbon and is then exposed to an atmosphere of second gas including ammonia. As the first gas, $CF_4$, $CH_4$, $C_2H_2$ or the like can be used. As the second gas, $NH_3$, a mixed gas of $N_2$ and $H_2$, or the like can be used.

According to the above method, by exposing the cubic boron nitride source material powder to the atmosphere of first gas, the surfaces of the particles of the cubic boron nitride source material powder are etched to remove oxygen therefrom, with the result that the cleaned surfaces are formed and the carbon (first gas) is attached onto the cleaned surfaces. Then, the cubic boron nitride source material powder having the carbon attached thereon is exposed to the atmosphere of second gas, with the result that the carbon is terminated by ammonia. As a result, the organic substance including carbon and nitrogen is attached on the cleaned surfaces.

As described above, the organic cubic boron nitride powder can be efficiently formed by one of the method employing supercritical water and the method of performing plasma treatment. In this step, it is preferable to use the method employing supercritical water. This is due to the following reason: the organic substance to be attached onto the cubic boron nitride source material powder can be readily made uniform and therefore the organic cubic boron nitride powder can be also readily made uniform.

In this step, the average particle size of the cubic boron nitride source material powder is not particularly limited. In order to form a cubic boron nitride sintered material having high strength, high wear resistance, and high defect resistance, the average particle size of the cubic boron nitride source material powder is preferably 0.1 to 10 pm, and is more preferably 0.5 to 5.0 μm.

When this step is performed using supercritical water, the organic substance to be used is preferably an amine or a hydrocarbon compound having a carbon number of more than or equal to 5. Among them, hexylamine, hexanenitrile, paraffin and hexane are more preferable. Hexylamine is further preferable. The present inventors have confirmed that when each of these organic substances is used, falling of the cubic boron nitride grains is dramatically reduced in the cubic boron nitride sintered material.

When this step is performed using plasma treatment, examples of the organic substance to be attached include an amine, carbon fluoride, and the like.

A preferable amount of the organic substance to be attached onto the cubic boron nitride source material powder is changed depending on the particle size of the cubic boron nitride source material powder. For example, when hexylamine is used as the organic substance, 50 to 2000 ppm of hexylamine is preferably attached onto the cubic boron nitride source material powder having an average particle size of 1 to 10 pm, and 100 to 5000 ppm of hexylamine is preferably attached onto the cubic boron nitride source material powder having an average particle size of 0.1 to 1μm. In each of such cases, a desired cubic boron nitride sintered material tends to be efficiently produced. The amount of the organic substance attached on the organic cubic boron nitride powder can be measured by, for example, gas chromatography mass spectroscopy.

Here, in the present embodiment, in the organic cubic boron nitride powder to be subjected to a below-described second step of the sintering step, carbon preferably exists to such an extent that the carbon reacts with remaining oxygen. Further, the amount of the organic substance attached on the cubic boron nitride source material powder tends to be decreased in a subsequent step (for example, a below-described purification step, preparing step, or the like). Therefore, even when the amount of the organic substance attached on the cubic boron nitride source material powder is different from the above-described amount, for example, is an excessive amount, it is considered that a suitable amount of carbon can remain on the organic cubic boron nitride powder to be subjected to the second step by making appropriate adjustment during each treatment of the subsequent step.

<<Purification Step>>

It is preferable to remove an impurity from the organic cubic boron nitride powder obtained by the above-described forming step, before using the organic cubic boron nitride powder in the below-described preparing step. Examples of the impurity include an unreacted organic substance. By removing the unreacted organic substance, an unintended reaction in the preparing step and/or sintering step can be suppressed.

For example, when the supercritical water is used, the organic cubic boron nitride powder is obtained as slurry. In this case, by performing centrifugal separation onto the slurry, the organic cubic boron nitride powder and the unreacted organic substance can be separated from each other.

Further, heat treatment may be performed (for example, at more than or equal to 250° C., preferably more than or equal to 400° C., or more preferably more than or equal to 850° C. in vacuum) onto the organic cubic boron nitride source material powder removed from the supercritical water or the organic cubic boron nitride source material powder having been subjected to the centrifugal separation or the like after being removed from the supercritical water. Thus, an impurity such as moisture on the surfaces of the particles of the organic cubic boron nitride powder can be removed.

Here, the present inventors have initially expected that when the heat treatment is performed onto the organic cubic boron nitride powder, the organic substance attached on the cubic boron nitride source material powder is entirely volatilized and/or ceases to exist. Surprisingly, however, as a result of observing the organic cubic boron nitride powder by Auger electron spectroscopy, it was confirmed that carbon uniformly remains on the surfaces of the particles of the organic cubic boron nitride powder although the organic substance was decomposed due to the heat treatment. This carbon is considered to be originated from the organic substance.

That is, it was confirmed that by performing the heat treatment onto the organic cubic boron nitride powder, not only the impurity on the surfaces of the particles of the organic cubic boron nitride powder is removed but also the organic cubic boron nitride powder including the particles having the modified surfaces on which the carbon was uniformly attached was obtained. The carbon remaining on the surfaces of the particles of the organic cubic boron nitride powder can lead to further reduction of oxygen on the organic cubic boron nitride powder in the below-described sintering step.

It should be noted that a mechanism is not clear as to why carbon remains uniformly on the surfaces of the particles of the organic cubic boron nitride powder after the heat treatment. The present inventors presume that since the cleaned surfaces formed by the treatment with supercritical water, plasma, or the like have a significantly high activity, the cleaned surfaces and the organic substance are bound to each other very strongly and this strong binding is involved in the surface modification of the organic cubic boron nitride powder.

<<Preparing Step>>

This step is a step of preparing a powder mixture including more than or equal to 85 volume % and less than 100 volume % of the organic cubic boron nitride powder and a remainder of a binder source material powder by mixing the organic cubic boron nitride powder and the binder source material powder, the binder source material powder including WC, Co and Al. The organic cubic boron nitride powder is the organic cubic boron nitride powder obtained by the above-described forming step, and the binder source material powder is a source material for the binder to be included in the cubic boron nitride sintered material.

The binder source material powder can be prepared as follows. First, WC powder, Co powder, and Al powder are prepared. Next, the powders are mixed at a predetermined ratio and are subjected to heat treatment (for example, 1200° C.) in vacuum, thereby forming an intermetallic compound. The intermetallic compound is pulverized by a wet ball mill, a wet bead mill, or the like, thereby preparing the binder source material powder including WC, Co, and Al. It should be noted that the method of mixing the powders is not particularly limited; however, in order to efficiently and uniformly mix the powders, ball mill mixing, bead mill mixing, planetary mill mixing, jet mill mixing, or the like is preferable. Each of the mixing methods may be performed in a wet manner or dry manner.

The organic cubic boron nitride powder and the prepared binder source material powder are preferably mixed by wet ball mill mixing employing ethanol, acetone or the like as a solvent. After the mixing, the solvent is removed by natural drying. Then, an impurity such as moisture on the surfaces thereof is preferably removed by heat treatment (for example, at more than or equal to 850° C. in vacuum). Thus, on the surfaces of the particles of the organic cubic boron nitride powder, the organic substance is decomposed and the carbon originated from the organic substance can uniformly remain as described above, thereby obtaining the organic cubic boron nitride powder including the particles having the modified surfaces. In this way, the powder mixture is prepared.

The binder source material powder may include other element(s) in addition to WC, Co, and Al. Suitable examples of the other element(s) include Ni, Fe, Cr, Mn, Ti, V, Zr, Nb, Mo, Hf, Ta, Re, and the like.

<<Sintering Step>>This step is a step of obtaining the cubic boron nitride sintered material by sintering the powder mixture. In this step, the powder mixture is sintered under a high-temperature and high-pressure condition, thereby producing the cubic boron nitride sintered material.

Specifically, first, as a first step, the powder mixture is introduced into a container and is vacuum-sealed. A vacuum sealing temperature is preferably more than or equal to 850° C. This temperature is a temperature of more than the melting point of a sealing material, and is a sufficient temperature by which the organic substance attached on the organic cubic boron nitride powder is decomposed and carbon originated from the organic substance remains uniformly on the surfaces of the particles of the organic cubic boron nitride powder.

Next, as a second step, the vacuum-sealed powder mixture is sintered using an ultra-high temperature and ultra-high pressure apparatus. Sintering conditions are not particularly limited, but are preferably 5.5 to 8 GPa and more than or equal to 1500° C. and less than 2000° C. In particular, in view of balance between cost and sintering performance, 6 to 7 GPa and 1600 to 1900° C. are preferable.

In the case where the heat treatment (the heat treatment in the purification step and/or the heat treatment in the preparing step) has been performed before this step, the organic cubic boron nitride powder including the particles having the modified surfaces on which carbon remains uniformly is subjected to the first step. In the case where no heat treatment has been performed before this step, the organic cubic boron nitride powder including the particles having the modified surfaces is prepared by the first step. Therefore, carbon uniformly exists on the surfaces of the particles of the organic cubic boron nitride powder to be subjected to the second step.

In the subsequent second step, the carbon attached on the surfaces of the particles of the organic cubic boron nitride powder reacts with the oxygen remaining on the organic cubic boron nitride powder to form carbon monoxide and/or carbon dioxide, which are then discharged to outside of the organic cubic boron nitride powder. Accordingly, oxygen on the organic cubic boron nitride powder is further removed, whereby the powder mixture including the organic cubic boron nitride powder in which the amount of oxygen is sufficiently reduced is sintered. In this way, the cubic boron nitride sintered material was produced.

<<Function and Effect>>

According to the above-described method of producing the cubic boron nitride sintered material according to the present embodiment, a cubic boron nitride sintered material having a long life can be produced. This is due to the following reason.

First, in the forming step, the oxygen existing on the cubic boron nitride source material powder is removed and reoxidation is suppressed, thereby forming the organic cubic boron nitride powder in which the amount of oxygen is reduced as compared with the conventional cubic boron nitride source material powder. Second, in the sintering step, oxygen remaining on the surfaces of the particles of the organic cubic boron nitride powder reacts with carbon remaining on the surfaces of the particles of the organic cubic boron nitride powder to form the reactant, which is then discharged to the outside of the organic cubic boron nitride powder. Hence, the oxygen remaining on the surfaces of the particles of the cubic boron nitride source material powder is further removed. Moreover, also in the preparing step, it is presumed that oxygen is removed by an action similar to that in the sintering step. This is because also in the preparing step, a certain amount of heat is applied to the powder mixture.

Due to the above reason, the amount of oxygen on the organic cubic boron nitride powder to be subjected to the sintering is significantly reduced as compared with the conventional cubic boron nitride particles. Therefore, neck growth between the cubic boron nitride grains becomes excellent to provide high binding strength between the cubic boron nitride grains, thereby obtaining a cubic boron nitride sintered material having a long life.

The above description includes features described below.

(Clause 1)

A cubic boron nitride sintered material comprising: more than or equal to 85 volume % and less than 100 volume % of cBN grains; and a remainder of a binder, wherein the binder includes WC, Co and an Al compound, and when a TEM-EDX is used to analyze an interface region including an interface at which the cBN grains are adjacent to each other, oxygen exists on the interface, and a width D of a region in which the oxygen exists is more than or equal to 0.1 nm and less than or equal to 10 nm.

(Clause 2)

The cubic boron nitride sintered material according to clause 1, wherein the width D is more than or equal to 0.1 nm and less than or equal to 5 nm.

(Clause 3)

The cubic boron nitride sintered material according to clause 1 or 2, wherein a maximum value M of a content of the oxygen in the region in which the oxygen exists is less than or equal to 5.0 atom %.

(Clause 4)

A cutting tool comprising the cubic boron nitride sintered material recited in any one of clauses 1 to 3.

(Clause 5)

A method of producing a cubic boron nitride sintered material, the method comprising:

forming an organic cBN powder by removing oxygen of cBN source material powder and attaching an organic substance onto the cBN source material powder;

preparing a powder mixture including more than or equal to 85 volume % and less than 100 volume % of the organic cBN powder and a remainder of a binder source material powder by mixing the organic cBN powder and the binder source material powder, the binder source material powder including WC, Co and Al; and obtaining the cBN sintered material by sintering the powder mixture.

(Clause 6)

The method of producing the cubic boron nitride sintered material according to clause 5, wherein the forming of the organic cBN powder includes introducing the cBN source material powder and the organic substance into supercritical water.

(Clause 7)

The method of producing the cubic boron nitride sintered material according to clause 5, wherein the forming of the organic cBN powder includes attaching the organic substance onto surfaces of particles of the cBN source material powder after etching the surfaces of the particles of the cBN source material powder by plasma treatment.

EXAMPLES

Hereinafter, the present invention will be described more in detail with reference to Examples, but the present invention is not limited thereto.

Experiment Example 1

First, an organic cubic boron nitride powder was formed. Specifically, first, supercritical water was formed using a supercritical water synthesis apparatus ("Momicho mini" provided by ITEC) under the following conditions. Pressure: 38 MPa Temperature: 390° C.

Flow Rate: 2 ml/minute

Next, a hexylamine source solution was continuously introduced into the apparatus to attain a hexylamine concentration of 10.0 weight % in the supercritical water. Further, a cubic boron nitride source material powder having an average particle size of 3μm was continuously introduced into the apparatus to attain an amount of the cubic boron nitride source material powder of 10 weight % in the supercritical water. In this way, the cubic boron nitride source material powder and the organic substance were introduced into the supercritical water. After the above-described supercritical water treatment was continued for 100 minutes, the temperature and pressure in the apparatus was returned to normal temperature and pressure to end the supercritical water treatment, and a whole of the obtained slurry was collected. The slurry was centrifuged (at 9000 rpm for 8 minutes) to separate an excess of hexylamine not attached on the cubic boron nitride source material powder. The concentrated slurry after the separation was dried (at −90° C. for 10 hours) to collect about 15 g of powder having been through the supercritical water treatment.

In this way, the organic cubic boron nitride powder was formed. The formed organic cubic boron nitride powder was subjected to gas chromatography mass spectroscopy, thus confirming that 782 ppm of hexylamine existed (attached) with respect to the cubic boron nitride powder.

Next, a binder source material powder serving as a source material of the binder was prepared. Specifically, WC powder, Co powder, and Al powder were prepared, and they were blended at a ratio of WC: Co: Al=50:42:8 in weight %. It should be noted that the average particle size of each powder was 2 μm. The mixture was made uniform by heat treatment (at 1250° C. for 30 minutes in vacuum), and was then pulverized into fine particles by a carbide ball mill. In this way, a binder source material powder having an average particle size of 1 μm was obtained.

The organic cubic boron nitride powder and the obtained binder source material powder were blended at the following ratio: the organic cubic boron nitride powder: the binder source material powder=86:14 in volume %. Then, they were mixed uniformly by the wet ball mill method using ethanol. Thereafter, the mixed powder was subjected to heat treatment at 900° C. in vacuum. The organic cubic boron nitride powder having been through the heat treatment was analyzed by Auger electron spectroscopy, thus confirming that carbon remained on the surfaces of the particles of the organic cubic boron nitride powder. In this way, a powder mixture was formed.

Next, the obtained powder mixture was sintered to form a cubic boron nitride sintered material. Specifically, the powder mixture was introduced into a container composed of Ta with the powder mixture being in contact with a WC-6%Co cemented carbide disc and a Co foil, and was vacuum-sealed. This powder mixture was sintered at 6.5 GPa and 1650° C. for 15 minutes using a belt-type ultra-high pressure and ultra-high temperature generating apparatus. In this way, the cubic boron nitride sintered material was formed.

Experiment Example 2

The concentration of hexylamine to be introduced was set to 7.5 weight %, and the organic cubic boron nitride powder and the binder source material powder were blended at the following ratio: the organic cubic boron nitride powder : the binder source material powder=94 : 6 in volume %. Except for the above, a cubic boron nitride sintered material was formed in the same manner as in Experiment Example 1.

The organic cubic boron nitride powder was subjected to gas chromatography mass spectroscopy, thus confirming that 607 ppm of hexylamine existed with respect to cubic boron nitride.

Experiment Example 3

The concentration of hexylamine to be introduced was set to 5.0 weight %. The organic cubic boron nitride powder and the binder source material powder were blended at the following ratio: the organic cubic boron nitride powder : the binder source material powder=92:8 in volume %. Then, they were uniformly mixed by the wet ball mill method using ethanol. Thereafter, heat treatment was performed onto the mixed powder at 250° C. in vacuum. Except for the above, a cubic boron nitride sintered material was formed in the same manner as in Experiment Example 1. The organic cubic boron nitride powder was subjected to gas chromatography mass spectroscopy, thus confirming that 350 ppm of hexylamine existed with respect to cubic boron nitride.

Experiment Example 4

The concentration of hexylamine to be introduced was set to 3.5 weight %. The organic cubic boron nitride powder and the binder source material powder were blended at the following ratio: the organic cubic boron nitride powder : the binder source material powder=92:8 in volume %. Then, they were uniformly mixed by the wet ball mill method using ethanol. Thereafter, heat treatment was performed onto the mixed powder at 400° C. in vacuum. Except for the above, a cubic boron nitride sintered material was formed in the same manner as in Experiment Example 1. The organic cubic boron nitride powder was subjected to gas chromatography mass spectroscopy, thus confirming that 212 ppm of hexylamine existed with respect to cubic boron nitride.

Experiment Example 5

The concentration of hexylamine to be introduced was set to 12.5 weight %, and the organic cubic boron nitride powder and the binder source material powder were blended at the following ratio: the organic cubic boron nitride powder : the binder source material powder=92:8 in volume %. Except for the above, a cubic boron nitride sintered material was formed in the same manner as in Experiment Example 1. The organic cubic boron nitride powder was subjected to gas chromatography mass spectroscopy, thus confirming that 1016 ppm of hexylamine existed with respect to cubic boron nitride.

Experiment Example 6

Instead of the method employing the supercritical water, the organic cubic boron nitride powder was formed by plasma treatment. Specifically, the surfaces of the particles of the cubic boron nitride source material powder were etched in a $CF_4$ atmosphere using a plasma modification apparatus (low-pressure plasma apparatus FEMTO provided by Dienner), and then the atmosphere in the apparatus was changed to an $NH_3$ atmosphere for the purpose of treatment of the cubic boron nitride source material powder having been etched. Except for the above, the cubic boron nitride sintered material was produced in the same manner as in Experiment Example 1.

Experiment Example 7

A cubic boron nitride sintered material was produced in the same manner as in Experiment Example 2 except that the plasma treatment was performed instead of the method employing supercritical water.

<Experiment Example 8>

A cubic boron nitride sintered material was produced in the same manner as in Experiment Example 3 except that the plasma treatment was performed instead of the method employing supercritical water.

Experiment Example 9

A cubic boron nitride sintered material was produced in the same manner as in

Experiment Example 4 except that the plasma treatment was performed instead of the method employing supercritical water.

<Experiment Example 10>

A cubic boron nitride sintered material was produced in the same manner as in Experiment Example 5 except that the plasma treatment was used instead of the method employing supercritical water.

<Experiment Example 21>

A cubic boron nitride sintered material was produced in the same manner as in Experiment Example 3 except that the powder mixture was prepared using a cubic boron nitride source material powder without the treatment employing supercritical water.

Experiment Example 22

A cubic boron nitride sintered material was formed in the same manner as in Experiment Example 4 except that the organic cubic boron nitride powder and the binder source material powder were blended at the following ratio: the organic cubic boron nitride powder : the binder source material powder=65:35 in volume %.

Experiment Example 23

A cubic boron nitride sintered material was formed in the same manner as in Experiment Example 1 except that the treatment employing supercritical water was not performed and only the cubic boron nitride source material powder was used with no binder source material powder being blended.

In the manner described above, the cubic boron nitride sintered materials of
Experiment Examples 1 to 10 and Experiment Examples 21 to 23 were formed. Here,
Experiment Examples 1 to 10 correspond to examples of the present disclosure.
Experiment Examples 21 to 23 correspond to comparative examples.

<Evaluation on Characteristics>
<<Width D and Maximum Value M>>

Each of the formed cubic boron nitride sintered materials was cut at an appropriate position, and then its exposed surface was polished to form a smooth surface. Thereafter, an argon ion slicer was used to slice the cubic boron nitride sintered material to form a cut piece having a thickness of 50 nm. Next, element mapping analysis and element line analysis by EDX were performed onto a second image (100 nm×100 nm) in accordance with the methods described above. On this occasion, "JEM-2100F/Cs" (trademark) provided by JEOL was used as a transmission electron microscope. As the energy dispersive X-ray analyzer, EDAX (trademark) provided by AMETEK was used. A beam diameter in the EDX was 0.2 nm and a scanning interval was 0.6 nm. Analysis Station provided by JEOL was used as software for the element mapping analysis and element line analysis by EDX. Results thereof are shown in Table 1. For the sake of reference, FIG. 2 shows a graph showing a result of line analysis in experiment example 3.

It should be noted that when there are visual fields in each of which the above-described conditions (1) and (2) are satisfied among six visual fields, each value shown in Table 1 represents an average value in each of the visual fields in each of which the above-described conditions (1) and (2) are satisfied. In each of the cut pieces of
Experiment Examples 1, 2 and 5 to 10, the above-described conditions (1) and (2) were satisfied in all of six arbitrarily extracted interface regions. In Experiment Example 3, the above-described conditions (1) and (2) were satisfied in one visual field of six arbitrarily extracted interface regions. In Experiment Example 4, the above-described conditions (1) and (2) were satisfied in three visual fields of six arbitrarily extracted interface regions.

<<Composition of Binder>>

A specimen having a length of 6 mm, a width of 3 mm, and a thickness of 0.45 to 0.50 mm was cut from each of the formed cubic boron nitride sintered materials, and XRD analysis was performed onto the specimen. Next, each specimen was immersed in hydrofluoric-nitric acid (acid mixture with concentrated nitric acid (60%): distilled water: concentrated hydrofluoric acid (47%)=2 : 2 : 1 at a volume ratio) at 140° C. for 48 hours within a sealed container, thereby obtaining an acid-treated solution having the binder dissolved therein. The acid-treated solution was subjected to ICP analysis.

The composition of the binder was specified in accordance with the results of XRD analysis and ICP analysis.

<<Bending Strength>>

The bending strength (GPa) of each specimen having been through the acid treatment was measured using a three-point bending tester at a stroke speed of 0.5 mm/min with a span of 4 mm. Results thereof are shown in Table 1.

<<Cutting Test>>

A cutting tool (substrate shape: DNGA150408; cutting edge treatment: T01225) was formed using each of the formed cubic boron nitride sintered materials. A cutting test was performed using this cutting tool under the following cutting conditions.

Cutting speed: 200 m/min.
Feeding speed: 0.1 mm/rev.
Depth of cut: 0.1 mm
Coolant: DRY
Cutting method: intermittent cutting
Lathe: LB400 (provided by OKUMA Corporation)
Workpiece: sintered component (hardened sintered alloy D-40 provided by Sumitomo Electric Industries with a hardened cutting portion having a hardness of 40 HRC).

The cutting edge was observed per cutting distance of 0.5 km so as to measure an amount of falling from the cutting edge. The amount of falling from the cutting edge was defined as a reduced width from the position of the ridgeline of the cutting edge before the cutting. The reduced width results from wear. In the case of occurrence of chipping, the size of chipping was defined as the amount of falling. A cutting distance at a point of time at which the amount of falling from the cutting edge became more than or equal to 0.1 mm was measured. It should be noted that this cutting distance was defined as an index of the life of the cutting tool. Results thereof are shown in Table 1.

TABLE 1

| | cBN (Volume %) | Width D (nm) | Maximum Value M (Atom %) | Bending Strength (GPa) | Cutting Distance (km) |
|---|---|---|---|---|---|
| Experiment Example 1 | 86 | 5.0 | 7.5 | 0.49 | 2.13 |
| Experiment Example 2 | 94 | 0.1 | 0.1 | 0.64 | 2.36 |
| Experiment Example 3 | 92 | 4.5 | 2.4 | 0.83 | 2.52 |
| Experiment Example 4 | 92 | 5.0 | 5.0 | 0.80 | 2.42 |
| Experiment Example 5 | 92 | 10.0 | 5.0 | 0.58 | 2.05 |
| Experiment Example 6 | 86 | 5.0 | 7.7 | 0.44 | 2.01 |
| Experiment Example 7 | 94 | 2.4 | 4.5 | 0.73 | 2.22 |
| Experiment Example 8 | 92 | 2.1 | 4.5 | 0.50 | 2.35 |
| Experiment Example 9 | 92 | 5.0 | 4.5 | 0.72 | 2.28 |
| Experiment Example 10 | 92 | 8.6 | 4.4 | 0.53 | 1.97 |

TABLE 1-continued

| | cBN (Volume %) | Width D (nm) | Maximum Value M (Atom %) | Bending Strength (GPa) | Cutting Distance (km) |
|---|---|---|---|---|---|
| Experiment Example 21 | 92 | 11.2 | 6.7 | 0.41 | 1.20 |
| Experiment Example 22 | 65 | 5.0 | 5.0 | Collapsed | 1.08 |
| Experiment Example 23 | 100 | 11.2 | 6.7 | Collapsed | 0.92 |

Table 1 also shows the volume % of the cubic boron nitride grains in the cubic boron nitride sintered material. Further, regarding the composition of the binder, it was confirmed that at least WC, Co, and Al compound existed in each of Experiment Examples 1 to 10 and Experiment Examples 21 to 22. Since no distinct peak was detected in XRD with regard to the Al compound, it was presumed that the Al compound was a composite compound composed of a plurality of Al compounds.

Referring to Table 1, in each of Experiment Examples 1, 2, 5 to 10 and 22, the above-described conditions (1) and (2) were satisfied in all the six visual fields of six arbitrarily extracted interfaces. In Experiment Example 3, the above-described conditions (1) and (2) were satisfied in one visual field of six arbitrarily extracted interface regions. In Experiment Example 4, the above-described conditions (1) and (2) were satisfied in three visual fields of six arbitrarily extracted interface regions. On the other hand, in each of Experiment Example 21 and Experiment Example 23, the above-described condition (2) was not satisfied in all the six visual fields of six arbitrarily extracted interfaces. In each of the columns of Experiment Examples 1 to 10 and 22, the average value in each of the visual fields in each of which the above-described conditions (1) and (2) are satisfied is shown. For the sake of reference, in each of the columns of Experiment Examples 21 and 23, the average value in the six visual fields is shown.

Referring to Table 1, it was confirmed that the cubic boron nitride sintered materials of Experiment Examples 1 to 10 have higher bending strengths than those of the cubic boron nitride sintered materials of Experiment Examples 21 to 23. It should be noted that "Collapsed" in each of Experiment Examples 22 and 23 means that the cubic boron nitride sintered material having been through the acid treatment was spontaneously broken. Regarding each of the cubic boron nitride sintered materials of Experiment Examples 1 to 10, it is understood that the cubic boron nitride grains are bound together strongly because the bending strength of the specimen having been through the acid treatment is high. This result also supports the hypothesis that the existence of a large amount of oxygen suppresses neck growth between the cubic boron nitride grains.

Further, in each of Experiment Examples 1 to 10, the cutting distance is significantly longer than that in each of Experiment Examples 21 to 23. In view of this, it was confirmed that the lives of the cubic boron nitride sintered materials according to Experiment Examples 1 to 10 were significantly long. Among them, in Experiment Examples 2 to 4 and 7 to 9, the cutting distances are significantly long. Hence, it was confirmed that when width D is 0.1 to 5.0 nm and maximum value M is less than or equal to 5.0 atom %, the life can be more significantly long.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A cubic boron nitride sintered material comprising: more than or equal to 85 volume % and less than 100 volume % of cubic boron nitride grains; and a remainder of a binder, wherein the binder includes WC, Co and an Al compound, and when a TEM-EDX is used to analyze an interface region including an interface at which the cubic boron nitride grains are adjacent to each other, oxygen exists on a whole or part of the interface, and a width D of a region in which the oxygen exists is more than or equal to 0.1 nm and less than or equal to 10 nm.

2. The cubic boron nitride sintered material according to claim 1, wherein the width D is more than or equal to 0.1 nm and less than or equal to 5 nm.

3. The cubic boron nitride sintered material according to claim 1, wherein a maximum value M of a content of the oxygen in the region in which the oxygen exists is less than or equal to 5.0 atom %.

4. A cutting tool comprising the cubic boron nitride sintered material recited in claim 1.

* * * * *